(12) United States Patent
Agarwal et al.

(10) Patent No.: US 8,797,891 B2
(45) Date of Patent: Aug. 5, 2014

(54) SYSTEM AND METHOD FOR CAPACITY PLANNING ON A HIGH SPEED DATA NETWORK

(75) Inventors: Nishant Agarwal, Voorhees, NJ (US); Tom Brown, West Chester, PA (US); John Paclik, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 607 days.

(21) Appl. No.: 12/706,455

(22) Filed: Feb. 16, 2010

(65) Prior Publication Data

US 2011/0199914 A1 Aug. 18, 2011

(51) Int. Cl.
*G01R 31/08* (2006.01)

(52) U.S. Cl.
USPC .......................................... 370/252; 370/235

(58) Field of Classification Search
USPC ......... 370/229, 231, 235, 242, 243, 244, 245, 370/252
See application file for complete search history.

(56) References Cited

U.S. PATENT DOCUMENTS

| | | | | |
|---|---|---|---|---|
| 5,164,938 A | * | 11/1992 | Jurkevich et al. | 370/231 |
| 6,751,664 B1 | * | 6/2004 | Kogan et al. | 709/224 |
| 6,771,440 B2 | * | 8/2004 | Smith | 360/31 |
| 7,403,987 B1 | | 7/2008 | Marinelli et al. | |
| 7,643,414 B1 | * | 1/2010 | Minhazuddin | 370/230 |
| 7,715,312 B2 | * | 5/2010 | Khasnabish et al. | 370/230 |
| 7,757,017 B2 | * | 7/2010 | Larson et al. | 710/29 |
| 2002/0039352 A1 | * | 4/2002 | El-Fekih et al. | 370/252 |
| 2003/0023716 A1 | * | 1/2003 | Loyd | 709/224 |
| 2004/0163000 A1 | | 8/2004 | Kuhlmann et al. | |
| 2007/0086334 A1 | | 4/2007 | Wakumoto et al. | |
| 2011/0060878 A1 | * | 3/2011 | Kaneko et al. | 711/114 |

OTHER PUBLICATIONS

Hubley, Walter and Schilling, Shane, "Case Study: SIP Business Voice Medium-Sized Op Offers Full-Size Service," Jul. 1, 2008, http://www.cable360.net/ct/deployment/casestudies/30562.html, 10 pages.
Extended European Search Report for EP11153919, dated Apr. 18, 2011.

* cited by examiner

*Primary Examiner* — Ricky Ngo
*Assistant Examiner* — Christine Ng
(74) *Attorney, Agent, or Firm* — Banner & Witcoff, Ltd.

(57) ABSTRACT

The present disclosure describes a method and system for monitoring the bandwidth utilization on a high speed data network port over time. According to the method described herein, measurements of the bandwidth utilization on the port may be taken over a predetermined time interval and analyzed to determine whether the utilization measurement equals or exceeds a predetermined upper threshold. If the port exhibits high bandwidth utilization within the time interval, an alert may be set for further monitoring of the port or for port augmentation.

21 Claims, 8 Drawing Sheets

SYSTEM AND METHOD FOR CAPACITY PLANNING ON A HIGH SPEED DATA NETWORK

REFERENCE TO RELATED APPLICATIONS

There are no related applications.

TECHNICAL FIELD

This disclosure generally relates to the management of network capacity. More specifically, the disclosure relates to a system and method for determining when augmentation is necessary on a high speed data network port.

BACKGROUND

High speed data service has become common in homes and businesses and the demand for high speed data service has seen an upward trend in recent years. Not only are consumers using the services provided over high speed data connections more often, but they are also using the connections for more purposes. For example, a consumer may receive Internet service, telephony service, such as Voice over Internet Protocol (VoIP) data, and other content services over one connection. In addition to the increased use of high speed data services, some of the applications themselves are becoming more complicated and require an increasing amount of bandwidth for transmission.

As the demand for high speed data service grows, high speed data service providers must increase the bandwidth available to consumers or risk compromising the consumer's data experience. Furthermore, high speed data service providers must be able to monitor the provision of such services, as well as the bandwidth utilization on specific ports, so that they can determine when an increase in bandwidth is necessary.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

Aspects of the present disclosure provide a method and system for monitoring the bandwidth utilization on a port in a high speed data network to determine whether the port has reached an unhealthy level of utilization.

In a first embodiment, utilization information for a port may be gathered and analyzed to determine if the utilization on the port exceeds a predetermined threshold over time. According to the embodiment, utilization measurements may be taken at predetermined time intervals, within a predetermined time window. The measurements may be analyzed to determine if they meet or exceed a predetermined threshold, such as a threshold of 70% of the total capacity of the port. Thereafter, the data may be analyzed to determine how many of the utilization measurements meet or exceed the predetermined threshold within the predetermined time window. If there is an unacceptable level of measurements with high utilization within the time window, the port may be put on alert for further monitoring or for augmentation.

In a second embodiment, utilization information for a port may be gathered and analyzed to determine if the utilization on the port exceeds a predetermined threshold at adjacent time intervals. According to the embodiment, utilization measurements may be taken at predetermined time intervals, within a predetermined time window. The measurements may be analyzed to determine if they meet or exceed a predetermined threshold. Thereafter, the data may be further analyzed to determine if adjacent measurements cross the threshold. If there are a preset number of adjacent measurements, such as three adjacent measurements, that meet or exceed the predetermined threshold, the port may be put on alert for further monitoring or for augmentation. Further, the adjacent measurements may be analyzed to determine if, within a predetermined time window, there are a preset percentage of adjacent measurements that cross the set threshold.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
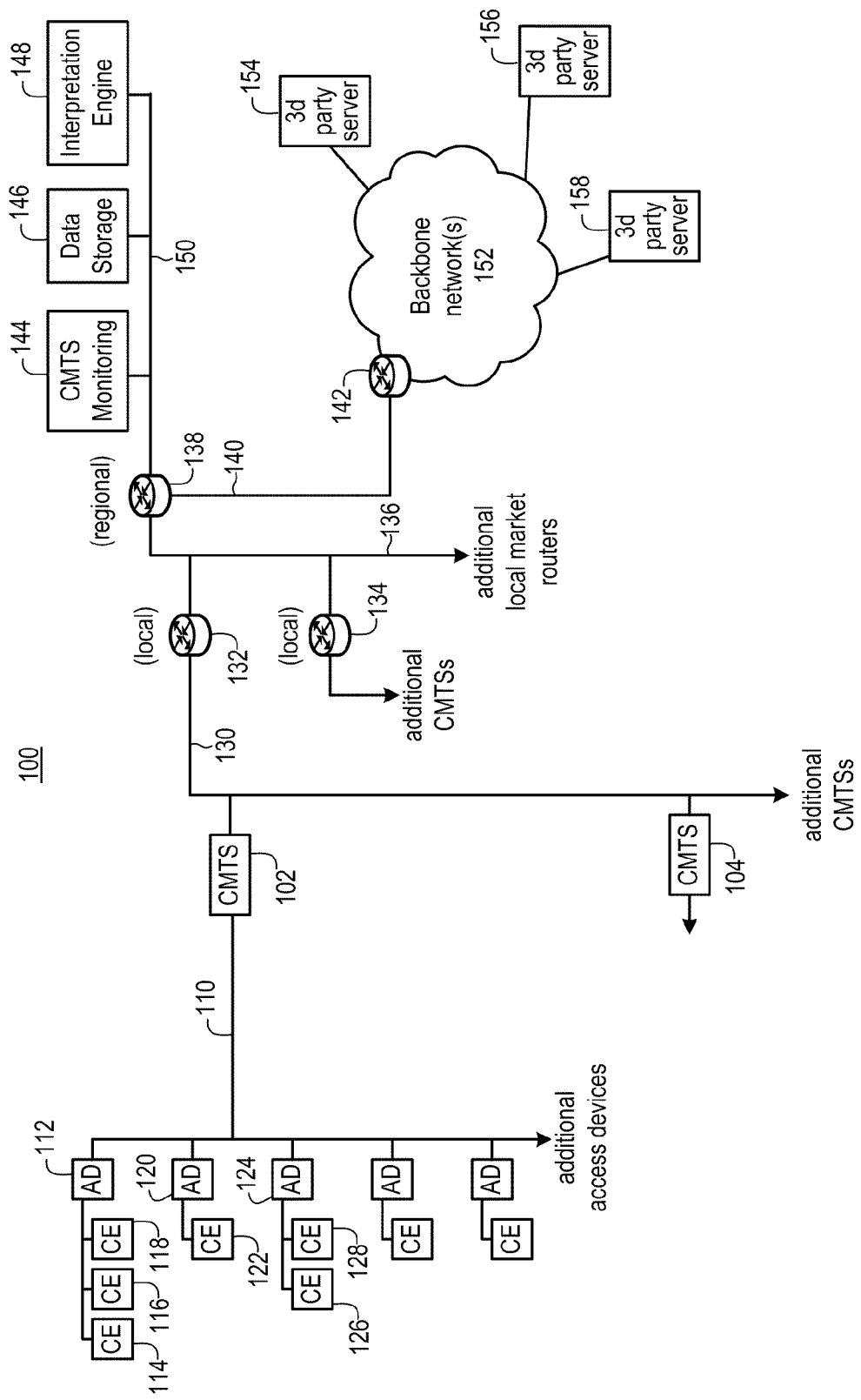
FIG. 1 depicts components of a high speed data network to which embodiments described herein may relate.

FIG. 1 is a diagram of a network 100 that includes devices configured to implement network management techniques according to at least some embodiments of the present disclosure. As depicted in FIG. 1, network 100 is a nationwide high speed data network that may include multiple access networks serving individual subscribers over hybrid fiber coaxial (HFC) plants and operated in accordance with one or more DOCSIS protocols. Network 100 may also be based on any high-speed backbone network technology, such as fiber-optic technology, and may be operated in accordance with other known data transmission technologies and protocols, such as internet protocol (IP) or asynchronous transfer mode (ATM). Network 100 provides High-Speed Internet (HSI) data service and other services (e.g., cable television, VoIP telephone service) to subscribing customers. Typically, each subscriber location has one or more types of subscriber access device (AD) that is used to communicate data from customer equipment devices (CE) at subscriber locations to other points in network 100 (and/or to points in other networks via network 100), and vice versa. Examples of customer equipment devices include, but are not limited to, personal computers (PC), other types of computers, gaming consoles, video and/or voice communication terminals, etc. Examples of access devices include, but are not limited to, cable modems, set top terminals, Media Terminal Adapters (MTA), etc.

Access devices 112, 120 and 124 may communicate with Cable Modem Termination System (CMTS) 102 over access port 110 of network 100, or other termination device, based on the underlying network. Although FIG. 1 only shows five access devices in the access network served by CMTS 102, additional access devices may be present, as indicated by an arrow. Similarly, CMTS 104 communicates with multiple access devices in a separate access network portion of network 100. As previously indicated, the access networks of CMTSs 102 and 104 may be HFC DOCSIS networks. For convenience, optical nodes, splitters, amplifiers, and other elements between CMTSs 102 and 104 and the access devices in their respective access networks are not shown in FIG. 1. Each CMTS forwards upstream communications from the access devices in its access network to other points in network 100, forwards data from other network 100 locations downstream to those access devices, and controls the ability of each access device in its access network to communicate with network 100. CMTSs 102 and 104, as well as additional CMTSs (not shown), may communicate over optical fibers 130 with a local market router 132. Local market router 132, together with local market router 134 serving additional CMTSs (not shown in FIG. 1) and additional local market routers serving other CMTSs (also not shown) may communicate over optical fibers 136 with a regional router 138. Regional router 138 may communicate over network connection 140 with a backbone network router 142. Although not shown in FIG. 1, additional regional routers (with associated local routers, CMTSs, etc.) communicate with backbone network router 142 or other backbone network routers. One or more Backbone network routers 142 are connected to backbone network(s) 152, such as the Internet, over which customers may communicate with third party servers, such as servers 154, 156 and 158 or make use of other third party services.

Also shown in FIG. 1 are a CMTS monitoring device 144, a data storage system 146 and an interpretation engine 148 that may communicate with each other and with other network 100 elements via connection link 150. Connection link 150 may be one or many different types of connection links known in the art, such as Ethernet or Gigabit Ethernet. Devices 144, 146 and 148 are discussed further below in connection with embodiments described herein.

So as to avoid unnecessary drawing complexity, only a small number of network elements are shown in FIG. 1. Numerous additional routers, CMTSs, optical nodes, servers, subscriber devices, etc., may be present in an actual network. Each of devices 144, 146 and 148 is embodied on a computing platform having at least a processor and memory for operation as described herein, as well as network interface hardware to facilitate communication with other network elements. Although illustrated as separate devices, the operations and functions of devices 144, 146 and 148 could be combined into fewer, or distributed across more, computing platforms.

Each of the CE devices shown in FIG. 1 may execute (or may be configured to execute) one or more application programs that communicate data across network 100. For example, some PCs or other computers may execute web browser applications for accessing web sites and other services available on the Internet. Other computers may execute various other types of application programs that transmit and receive data through network 100 via a cable modem or other type of subscriber access device. Examples of such programs include file sharing programs, games, email clients, clients for viewing IP television (IPTV) program content, etc.

CMTS monitoring device 144 may gather data from CMTS devices for use in analyzing the bandwidth utilization on one or more ports of the CMTS, for example, on port 110 of CMTS 102. Data that is gathered by CMTS Monitoring Device 144 may be stored by data storage device 146. Further, interpretation engine 148 may analyze the data that is gathered by CMTS monitoring device 144 and stored by device 146.

Figure 2:
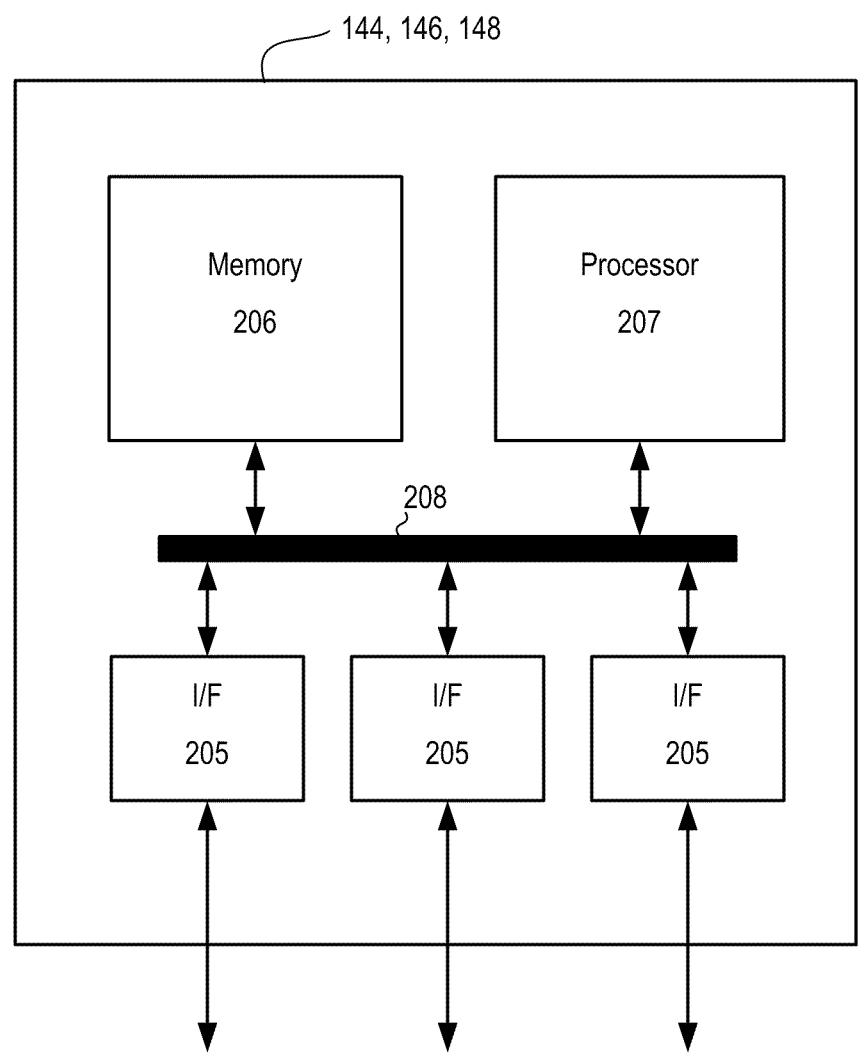
FIG. 2 depicts an embodiment of a computer system on which aspects of the present disclosure may be implemented.

In at least some embodiments, each of CMTS monitoring device 144, data storage device 146 and interpretation engine 148 may be implemented as multiple computing platforms for redundancy and/or to increase the amount of analysis, data storage and other operations being performed simultaneously. FIG. 2 is a partial schematic block diagram of a computing platform that can act as one of CMTS monitoring device 144, data storage device 146 or interpretation engine 148. The computing platform includes one or more hardware interfaces 205 that provide physical connections by which the computing platform communicates with other devices in network 10. Interfaces 205 may be any type of network interface well known to those skilled in the art, e.g., Ethernet, optical, etc. The computing platform further includes memory 206 for storing instructions and data and a processor 207 for executing instructions and controlling operation of the computing platform. Although a single block is shown for memory 206 and a single block shown for processor 207, memory and computational operations of the computing platform could respectively be distributed across multiple memory devices and multiple processors located within the computing platform and/or across memory and processors located on multiple platforms. Memory 206 may include volatile and non-volatile memory and can include any of various types of storage technology, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. Processor 207 may be implemented with any of numerous types of devices, including but not limited to one or more general purpose processors, one or more application specific integrated circuits, one or more field programmable gate arrays, and combinations thereof. In at least some embodiments, processor 207 carries out operations described herein according to machine readable instructions stored in memory 206 and/or stored as hardwired logic gates within processor 207. Processor 207 communicates with and controls memory 206 and interfaces 205 over one or more buses 208.

Embodiments described herein include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause a server or other network device to carry out operations such as are described herein. As used herein (including the claims), a machine-readable storage medium is a physical structure that can be touched by a human. A modulated signal would not by itself constitute a machine-readable storage medium.

Embodiments described herein reflect methods and systems for monitoring bandwidth utilization on a port, such as port 110 on high speed data network 100. Referring to the exemplary network depicted in FIG. 1, for example, multiple ADs 112, 120, and 124 may be connected to backbone network 152 over port 110 via CMTS 102. As the number of ADs that are connected to a particular port increases, utilization on the port typically increases. In addition, bandwidth utilization may increase as consumers utilize additional CE devices, or increase their utilization on existing devices.

The port utilization monitoring techniques described herein can help identify those ports where the bandwidth utilization has reached a level that risks compromising the consumer experience and therefore should be augmented. Augmentation may include adding equipment, such as additional CMTS devices with additional ports, or increasing the available bandwidth on a particular port.

Figure 3:
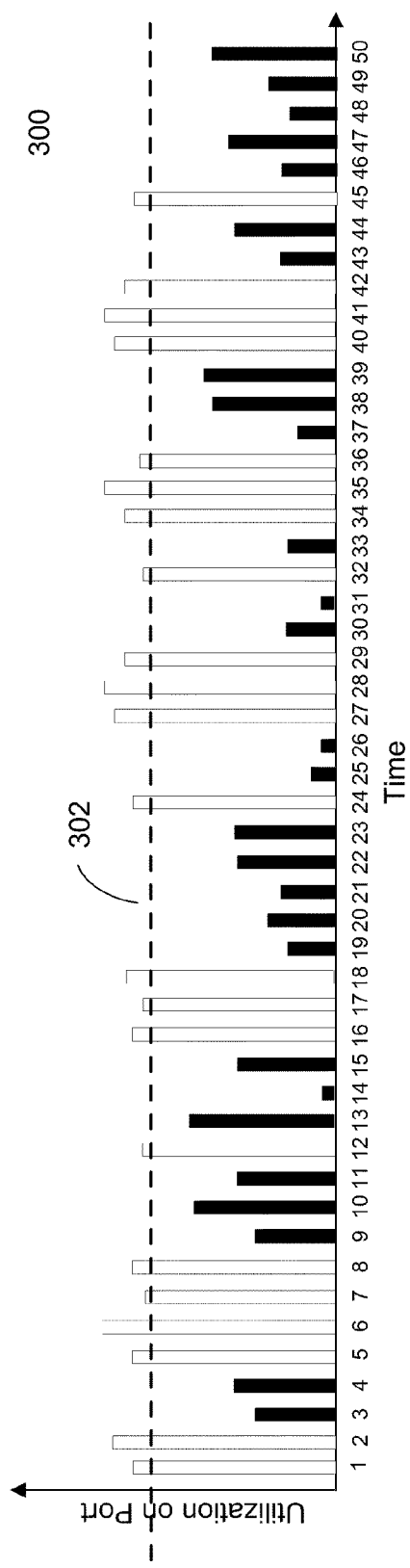
FIG. 3 depicts a graphical analysis of port utilization according to one embodiment of the present disclosure.
Figure 4:
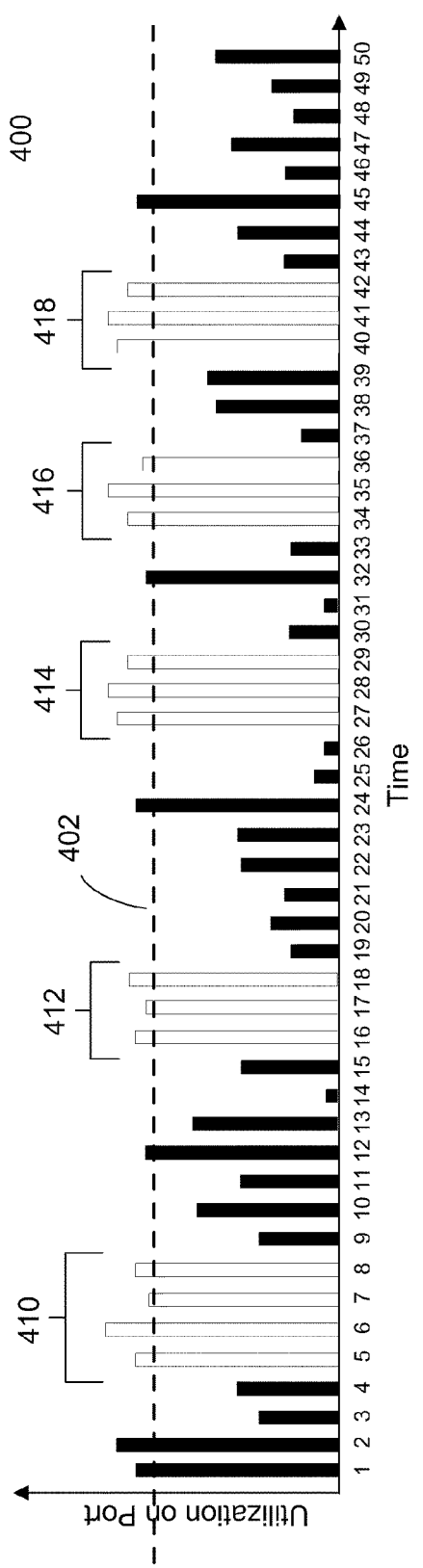
FIG. 4 depicts a graphical analysis of port utilization according to another embodiment of the present disclosure.

FIGS. 3 and 4 each depict a graphical view of a typical bandwidth utilization analysis on a port. Each graph, 300 and 400, depicts the same 50 utilization measurements taken over time for an exemplary port. According to embodiments described herein, such measurement data may be mined from a CMTS, or other network access device, by CMTS monitoring device 144, or another monitoring device, at a preset polling interval, such as every five, 10, or 15 minutes.

The graph 300 of FIG. 3 highlights the frequency with which the bandwidth utilization measurements 1-50 cross a threshold 302. According to graph 300, the white bars highlight those measurements where the utilization on the port hits or exceeds a set threshold 302. For example, in graph 300, the white bars (e.g., bars numbered 1, 2, 5, 6, 7, 8, 12, etc.) depict utilization measurements at or above threshold 302. The black bars in graph 300 (e.g., bars numbered 3, 4, 9, 10, 11, 13, 14, 15, etc.) depict utilization measurements below threshold 302.

According to embodiments described herein, the bandwidth utilization on a port may be monitored to determine if the utilization has reached an unacceptably high level such that the capacity of the port needs to be increased or equipment should be added. In one embodiment, the utilization on the port may be monitored at a preset interval to determine the number of times the utilization hits or exceeds a preset threshold. According to the embodiment, if the utilization crosses the threshold more than a preset percentage in a preset period, the port would be considered unhealthy. Thus, the embodiment considers the frequency with which a threshold is violated. Looking at the frequency with which a threshold is violated also allows for anomalies to be disregarded, such as a single utilization measurement above a preset threshold. For instance, the system disclosed herein may monitor a port every five minutes, and analyze the data in a one hour time period. If there are two instances in the one hour time period that exceed the threshold, it may not matter, but if 50% (or some other predetermined percentage) of the measurements exceed the threshold, then the port may be a candidate for further monitoring or augmentation.

Utilization readings may be further categorized based on defined thresholds. For example, according to utilization monitoring following the frequency methodology described above, an unhealthy port may be a port where the port utilization frequently exceeds a 60% threshold, or where a certain percentage of readings within a certain interval exceed a preset threshold, such as 10% of readings within the interval. Likewise, a potentially unhealthy port may be a port where the port utilization frequently lies between 40% and 60% of peak utilization; and a healthy port utilization level may be a port where the port utilization is most frequently below 40% of peak utilization. Analysis of the port utilization measurements in accordance with the described embodiments may be used to identify whether or not a particular port is operating within a healthy or reasonable utilization level overall, as well. For example if only 10% of the readings are in the range below 40% peak utilization, the port may be considered unhealthy overall, and a candidate for augmentation. However, those skilled in the art will recognize that the monitoring thresholds identified herein are merely exemplary, and that the monitoring threshold may be set higher or lower based on what would be meaningful in a particular situation. Further, those skilled in the art will recognize that it may be appropriate to analyze data more frequently or less frequently than the exemplary five minute interval, and within the exemplary one hour period. For instance, shorter or longer monitoring intervals may be used, as well as a shorter or longer monitoring time period.

Referring back to FIG. 4, graph 400 depicts the same 50 bandwidth utilization measurements for the same port as in FIG. 3; however FIG. 4 highlights only those bandwidth utilization measurements where three or more adjacent utilization measurements either hit or exceed the bandwidth utilization threshold 402. According to graph 400, the measurements which meet this exemplary adjacency requirement of three include the groups 410, 412, 414, 416 and 418. The group 410 may include two adjacency groups: the group consisting of measurements 5, 6 and 7; and the group consisting of measurements 6, 7 and 8. Thus, FIG. 4 depicts a graphical analysis of measurement data according to an alternative embodiment that not only considers whether the bandwidth utilization crosses a predefined threshold 402, but also considers whether measurements at adjacent intervals are also points of infraction. The embodiment, the analysis of which is depicted in graph 400, emphasizes that there may be circumstances where it is more appropriate to consider whether there is a sustained surge of congestion before a network administrator incurs a capital expenditure, such as equipment augmentation. Furthermore, those skilled in the art will recognize that it may be appropriate to consider levels of adjacency beyond three. For example, if a port is already showing higher than normal utilization, it may be appropriate to trigger an alert when only two adjacent measurements meet or exceed a utilization threshold. On the other hand, in some circumstances, it may be appropriate to consider triggering an alert only when four or more adjacent measurements meet or exceed the threshold.

Figure 5:
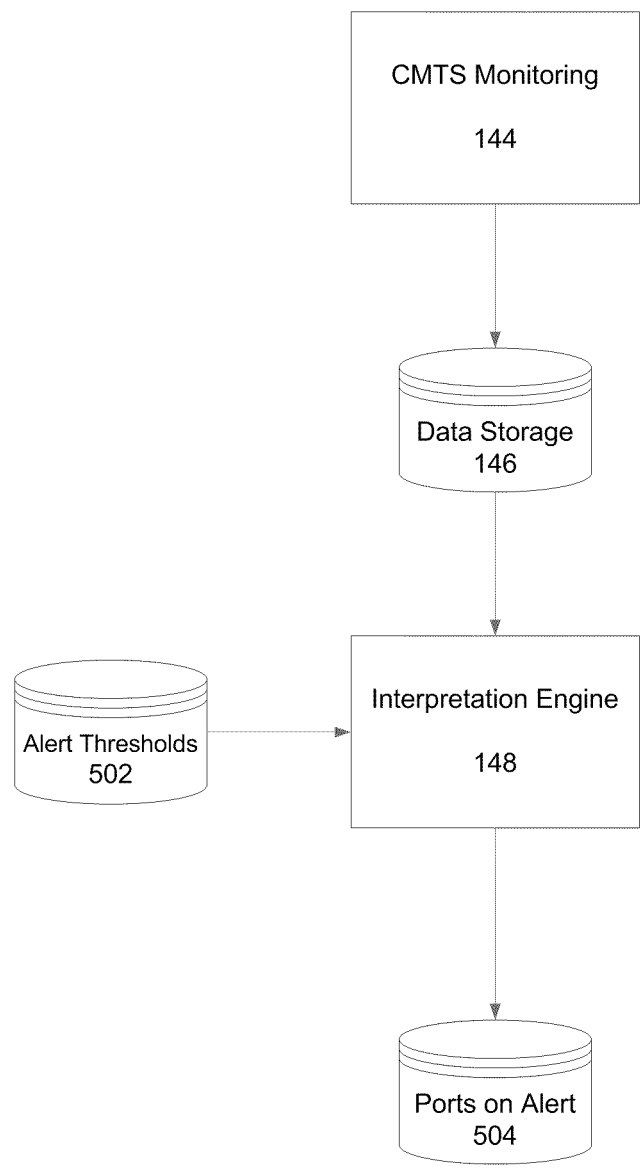
FIG. 5 depicts a flowchart describing various components on which aspects of the present disclosure may be implemented.

FIG. 5 depicts how various devices described herein may work together to implement embodiments described herein. CMTS monitoring device 144 may comprise a general purpose computer with special software or special purpose hardware that is configured to receive data from a CMTS or other network access device. Such data may include a specific Port ID, a time stamp, and a traffic volume count or bandwidth utilization measurement. Since the CMTS monitoring device 144 may gather data about network traffic from a large number of network elements, the data may need to be time-aligned or synchronized for analysis. The CMTS monitoring device 144 may format and/or align data as necessary including converting traffic volume counts into 'percent of capacity used' (utilization) and standardizing/aligning time stamps and balancing traffic volumes so as to create consistent reporting intervals (e.g. five minute intervals starting at xx:00:00).

As one example, data may be time-aligned by the following method. Consider, for example, one port, port A, with three utilization measurements: A1 at time 3:56:20 with a utilization measurement of 73% of total port bandwidth; A2 at time 4:01:45 with a utilization measurement of 62% of total port bandwidth; and A3 at time 4:07:03 with a utilization measurement of 71% of total port bandwidth. For the example described, the timestamps may be considered end-of-interval timestamps, wherein the exemplary interval is five minutes or 300 seconds. According to the example, the data may be time aligned to intervals ending at 4:00:00, 4:05:00, and 4:10:00, etc. by using a weighted value for each aligned interval. For the first interval, 4:00:00, the only measurement in the example is measurement A1 at timestamp 3:56:20. Because A1 represents only one measurement, there is insufficient data to time-align. For the second interval, 4:05:00, there are two measurements, A2 and A3, which is sufficient data for time-aligning. Thus, according to the exemplary method, the utilization measurements A2 and A3 may be averaged for the 300 second time interval (the time interval starting at 4:00:00 and ending at 4:05:00) according to the following formula:

$$(((4:01:45-4:00:00)*62\%)+((4:05:00-4:01:45)*71\%)/300)=67.85\%$$

Thus, according to the time-aligning example described, the time-aligned utilization value for the interval ending at 4:05:00 would be a utilization measurement value of 67.85%. The example described above represents only one method that may be used to time align the data. Those skilled in the art will recognize that there are additional suitable methods for time-aligning data and will be able to determine and utilize appropriate methods.

The resulting formatted data may then be stored in data storage 146 and made available for interpretation or analysis by the interpretation engine 148. According to some embodiments, interpretation engine 148 can perform the step of formatting and/or aligning the data.

Interpretation engine 148 may comprise a general purpose computer running special purpose software to analyze monitoring data and compare individual port utilization patterns over time to data in an alert thresholds repository 502. As described earlier, thresholds may be preset and stored in memory, and those of skill in the art will be able to recognize and set useful threshold parameters. When a threshold is met or crossed by the monitoring data, the port may be identified as being on alert in a ports on alert 504 data repository.

Alert thresholds repository 502 may define specific behavior patterns for port utilization which are indicative of problem ports. The pattern definitions may be hard coded into software directly through a procedural computer language. The pattern definition may be represented in one or more configuration files which define specific scenarios. Interpretation engine 148 may communicate with alert thresholds 502 when analyzing various monitoring data to determine if one or more preset utilization threshold(s) have been met.

Ports on alert repository or process 504 may store instances of alerts for selected ports that are being monitored. At any time, the repository 504 may hold port alert information related to a number of ports. Data in the Ports on Alert repository may be accessed and used for a variety of purposes related to port utilization monitoring, such as to prioritize equipment augmentation across the monitored ports. For instance, those ports having the highest number of recorded alerts may be the first ports to be split across new equipment to increase network capacity and to ensure a positive and seamless consumer experience.

Figure 6:
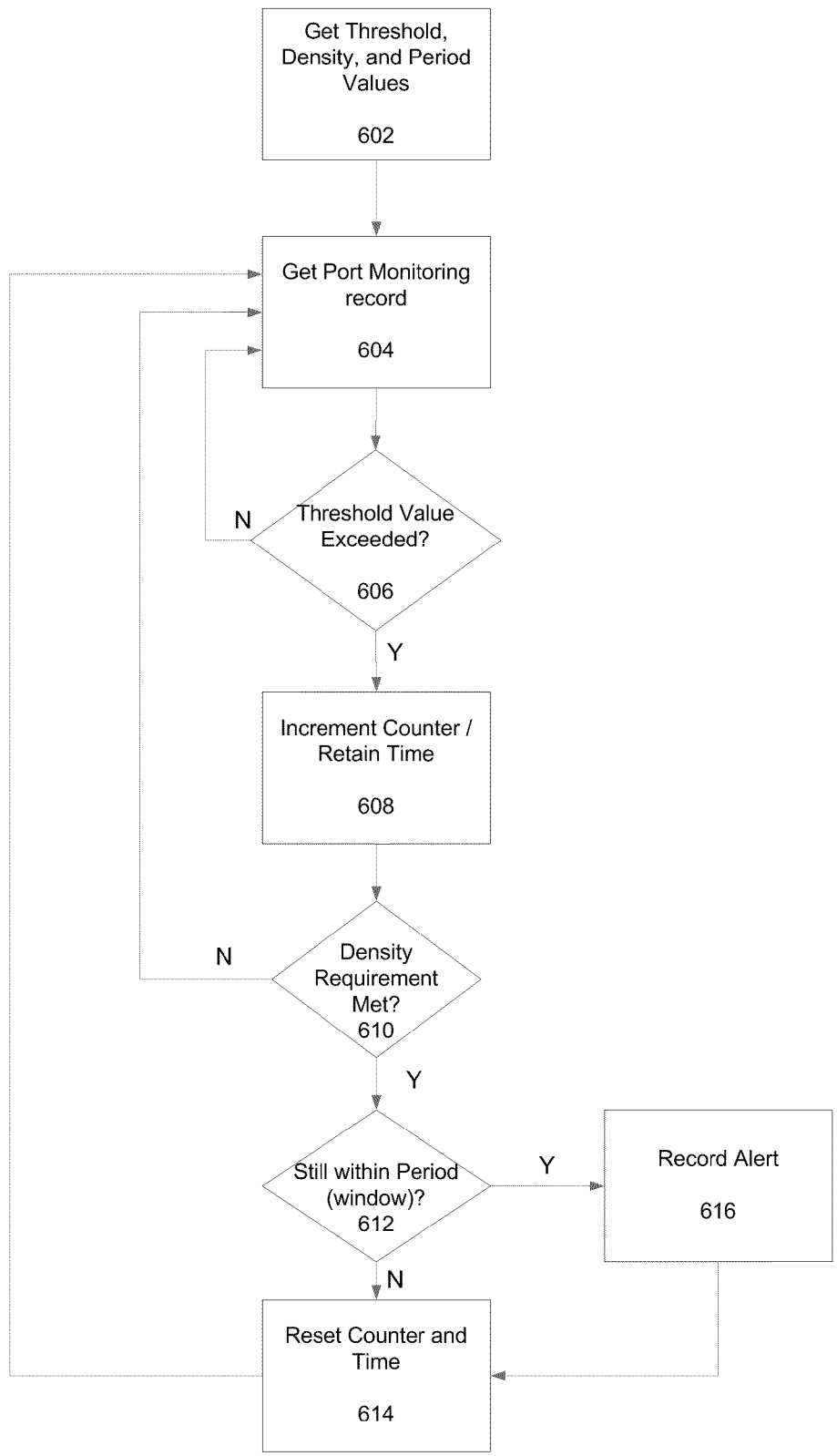
FIG. 6 depicts a flowchart describing implementation of one embodiment of the present disclosure directed to a frequency model.

FIG. 6 provides an exemplary flow chart of the logic supporting a process for identifying network ports with higher than acceptable bandwidth utilization, according to a frequency pattern identification embodiment. At step 602, the interpretation engine 148 establishes and/or sets a threshold or intensity value, a density value and a period value for use in analyzing monitoring data that is gathered for ports to be monitored. For example, the interpretation engine 148 may set a utilization threshold or intensity at 70% of maximum available bandwidth, and further determine that the threshold must be exceeded at least three times (a density) within a period of an hour, wherein data points are gathered every five minutes. The density value represents the incidence or count of intervals which must meet or exceed the preset intensity threshold. The period value may be any contiguous period, such as, within an hour, or on consecutive Mondays, etc. The period value may also be a non-contiguous window, such as, each Monday night from 8 p.m. to 9 p.m., or on weekday evenings from 8 p.m. to 11 p.m., etc. The threshold, density and period values may be preset and stored in the alert thresholds process 502, or may be determined by the interpretation engine 148.

At step 604, the interpretation engine 148 receives port monitoring data from the CMTS monitoring device 144 or the data storage device 146. Thereafter, each recorded instance is processed to determine if the established utilization threshold has been exceeded (step 606). If the threshold is exceeded, at step 608 the interpretation engine 148 increments a counter and records the time stamp, as well as any other parameters associated with the data. For example, if the preset intensity threshold required a bandwidth utilization measurement of greater than 60% of the maximum bandwidth available, the interpretation engine 148 might record a first instance of a utilization measurement of 68% at 1:05 pm, wherein the period of measurement is between 1:00 p.m. and 2:00 p.m. Further according to the example, if the density threshold for the preset period of 1:00 p.m. to 2:00 p.m. is five measurements over the 60% threshold, at step 610, the interpretation engine 148 would determine that the one data point has not yet met the density threshold of five measurements over the 60% threshold. However, at a later point in time, after determining that an established density requirement has been met at step 610, the interpretation engine 148 can determine if the threshold-exceeding data instances are still within the set period, for example, the 1:00 p.m. to 2:00 p.m. period. Finally, at step 616, if the data instances of interest are all recorded within the preset period, the interpretation engine 148 records an alert for the affected port to the ports on alert process 504. Otherwise, the interpretation engine 148 resets the counter at step 614 for analysis of a different port, a new period, or at a different bandwidth utilization threshold.

Figure 7:
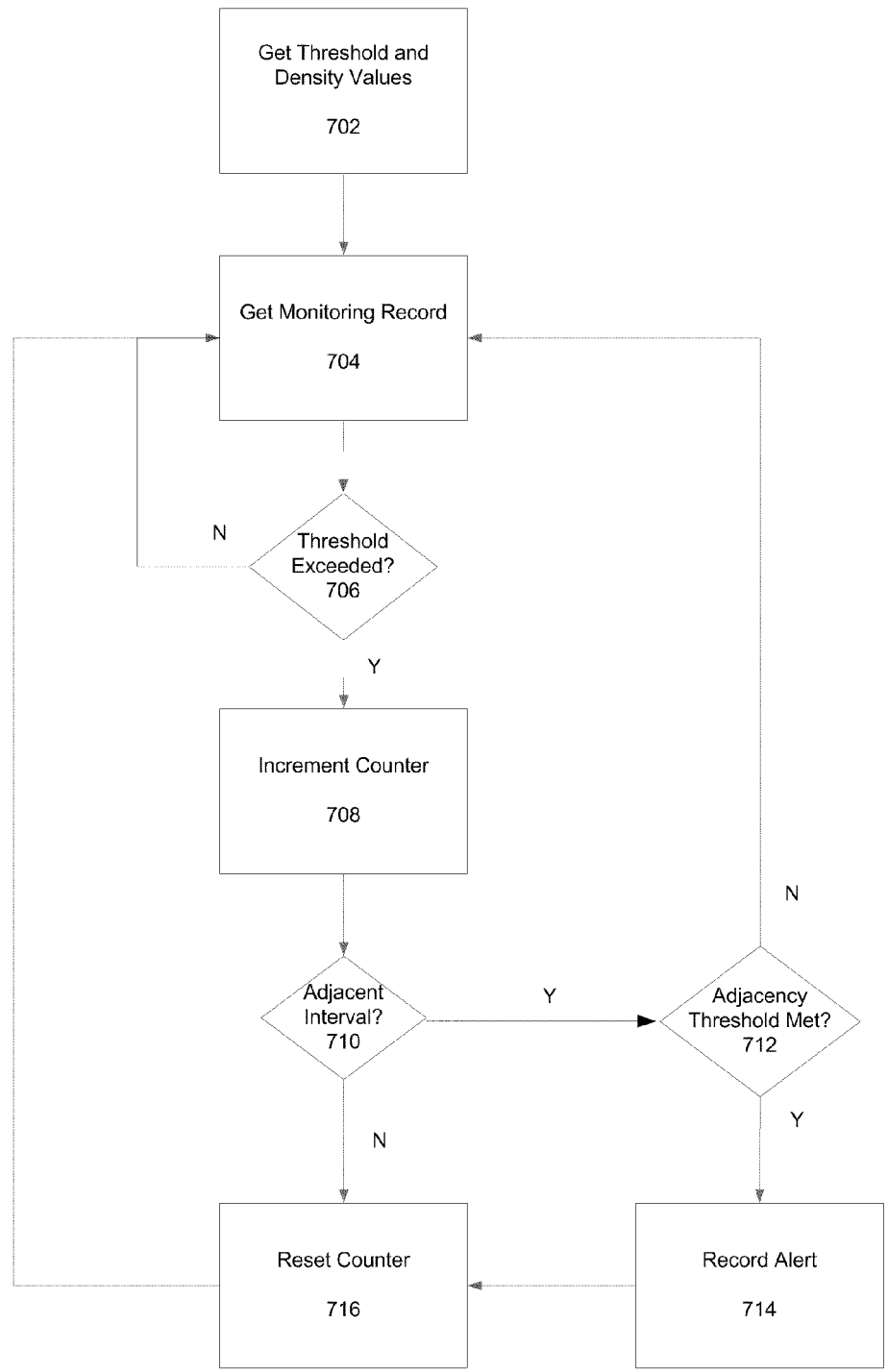
FIG. 7 depicts a flowchart describing implementation of one embodiment of the present disclosure directed to a wave model.

FIG. 7 provides an exemplary flow chart of the logic supporting a process for identifying network ports with higher than acceptable bandwidth utilization, according to a wave pattern identification embodiment. At step 702, the interpretation engine 148 establishes and/or sets a threshold or intensity value and a density value for use in analyzing monitoring data that is gathered for ports to be monitored. Referring back to the example introduced above, the interpretation engine 148 may set a utilization threshold or intensity at 70% of maximum available bandwidth. According to the wave pattern embodiment, the density threshold corresponds to the number of adjacent readings that cross the intensity threshold, for example, three adjacent readings above the preset threshold. Referring back to FIG. 4, the three adjacent readings 412 (i.e., bars numbered 16, 17 and 18) above threshold 402 provide a graphical representation of adjacent data points which meet or exceed the preset intensity threshold. The threshold and density values may be preset and stored in the alert thresholds process 502, or may be determined by the interpretation engine 148.

At step 704, the interpretation engine 148 receives port monitoring data from the CMTS monitoring device 144 or the data storage device 146. Thereafter, each recorded instance is processed to determine if the established utilization threshold has been exceeded (step 706). If the threshold is exceeded, at step 708 the interpretation engine 148 increments a counter and records the time stamp, as well as any other parameters associated with the data. Referring back to the example described above, if the preset intensity threshold requires a bandwidth utilization measurement of greater than 60% of the maximum bandwidth available, the interpretation engine 148 might record a first instance of a utilization measurement of 68% at 1:05 p.m. Further according to an example, if the density threshold according to the wave embodiment is three adjacent measurements over the 60% threshold, at step 710, the interpretation engine 148 further determines if the data point (68% at 1:05 p.m.) is adjacent to a data point that also crosses the intensity threshold, i.e., whether a 1:00 p.m. data point also exceeds the threshold. If the 1:00 p.m. data point is an adjacent data point, the interpretation engine 148 determines if a density threshold of three adjacent data points with measurements over the 60% threshold has been met at step 712. At step 714, if the density/adjacency threshold has been met, the interpretation engine 148 records an alert for the affected port to the ports on alert process 504. However, if the interpretation engine determines at step 710 that the data point is not an adjacent data point, the interpretation engine 148 resets the counter at step 716 and attends to the next data instance at step 704.

Though discussed separately, those skilled in the art will recognize that the wave and frequency pattern identification embodiments as described above may be combined to further tailor the analysis of bandwidth utilization across a port. For example, the frequency and wave methodologies could be combined to detect when a preset number of adjacent intervals, such as three adjacent intervals, cross a threshold, for example, a 70% utilization threshold, on a periodic basis, such as every Saturday afternoon. In this way, it may be desirable to combine the methodologies to determine if a pattern of congestion is occurring.

Figure 8:
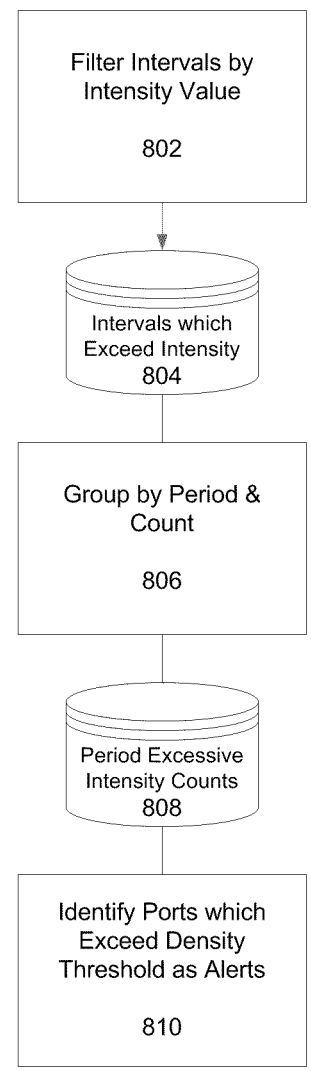
FIG. 8 depicts a flowchart describing implementation of another embodiment of the present disclosure directed to a frequency model.
Figure 9:
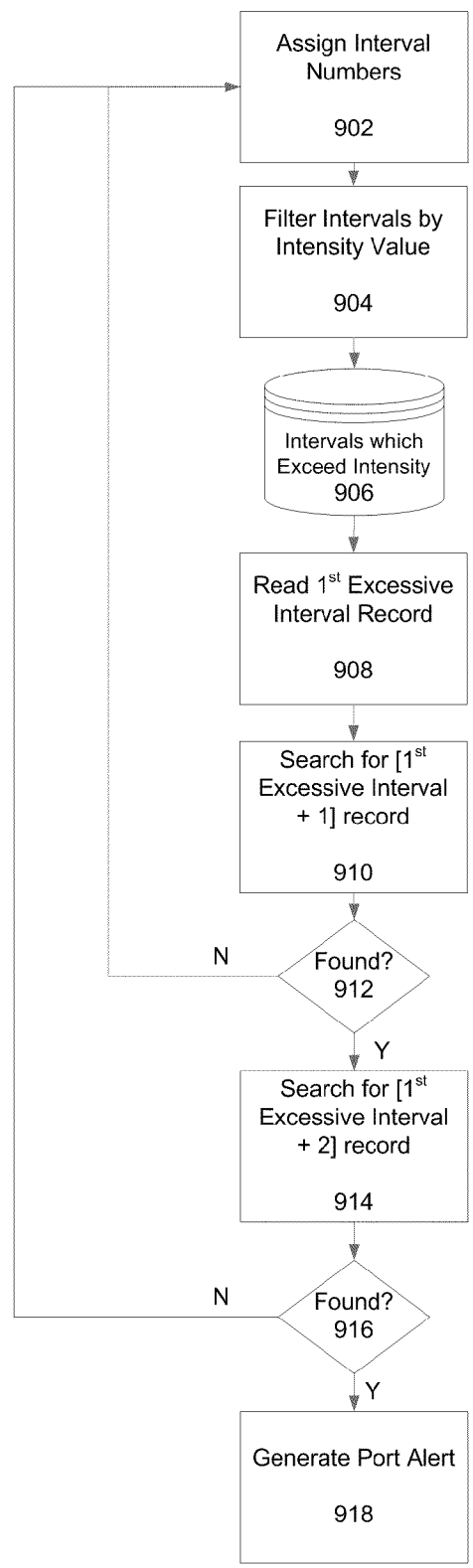
FIG. 9 depicts a flowchart describing implementation of another embodiment of the present disclosure directed to a wave model.

FIGS. 8 and 9 depict alternative processes for identifying network ports with higher than acceptable bandwidth utilization, according to the frequency pattern and the wave pattern embodiments described above, respectively. For example, the flowcharts depicted in FIGS. 8 and 9 describe processes for analyzing data by set processing, such as when using a relational database, instead of analyzing data records one at a time. Thus, FIGS. 8 and 9 depict processes according to the present disclosure wherein groups of data are handled at the same time.

The flowchart in FIG. 8 describes the process of analyzing a group of data according to the frequency methodology described herein. At step 802 the interpretation engine examines data in a specified interval and creates a subset of the data for which a measured utilization value exceeds a predetermined threshold or intensity value, for example, the intervals where the utilization is 70% of the total port bandwidth or greater. Once determined, the interpretation engine may record the port and timestamp information for the high intensity intervals at 804. At step 806 the interpretation engine may analyze the high intensity intervals recorded in 802 and create a report for each port and time period (e.g., a time interval from 4:00:00-4:05:00), which tracks the count of intervals in the time period for the port. For example, the interpretation engine may determine that four intervals for a Port "A" exceeded a preset 70% utilization level for the time period, and create such a report at 808. At step 810, the interpretation engine compares the determination from 806 to a preset target density value, to determine which ports should be put on alert. For example, an alert for Port "A" may be set for recording four time intervals above a 70% utilization threshold, wherein a preset limit requires an alert if the three or more intervals exceed the 70% utilization threshold within a preset time period.

The flowchart of FIG. 9 describes the process of analyzing a group of data according to the wave methodology described herein. According to the process, at step 902, the interpretation engine assigns ascending, consecutive, interval numbers to each time interval for a port that is to be monitored. At step 904, the interpretation engine considers the numbered interval data and creates a subset of the intervals where a utilization measurement value exceeds a pre-determined intensity or utilization threshold value, e.g., those intervals where the bandwidth utilization is equal to or greater than 70% of the available bandwidth. At step 906, a port, number, and timestamp may be recorded for each of the high intensity intervals identified. At steps 908 and 910 the interpretation engine may take the interval number of the first high intensity interval identified, add 1 to the interval number, and determines if the first high intensity interval +1 is in the high intensity list identified. If not, at 912, the process starts again with step 902. If the first high intensity interval +1 is in the high intensity list identified, at step 914 the interpretation engine may take the interval number of the first high intensity interval identified, add 2 to the interval number, and determines if the first high intensity interval +2 is in the high intensity list identified. If not, at 916, the process starts again with step 902. If the first high intensity interval +2 is in the high intensity list identified, at step 918, the interpretation engine may generate an alert for the port being monitored.

Those skilled in the art will appreciate that aspects described herein may be implemented in a variety of different system and network configurations beyond those specifically exemplified. For example, the methodologies described herein may be implemented on high-speed data networks built on fiber-optic technology or wireless technology, and still fall within the spirit and scope of the appended claims. Furthermore, those skilled in the art will appreciate that such high-speed data networks may utilize any of a variety of underlying transmission protocols such as IP, ATM, wireless networking, etc.

Thus, while the disclosure has been with respect to specific examples and preferred embodiments, those skilled in the art will appreciate that there are numerous variations and permutations of the above described systems and techniques that fall within the spirit and scope as set forth in the appended claims.

We claim:

1. A method for monitoring bandwidth utilization on a port in a data network comprising:
   receiving, at a processor, a first measurement of bandwidth utilization at a first time for the port, wherein bandwidth utilization identifies a current amount of bandwidth of the port being used relative to a maximum available bandwidth of the port;
   determining, at the processor, whether the first measurement of bandwidth utilization equals or exceeds a predetermined utilization threshold;
   receiving, at the processor, at least one subsequent measurement of bandwidth utilization at a subsequent time for the port;
   determining, at the processor, whether the at least one subsequent measurement of bandwidth utilization equals or exceeds the predetermined utilization threshold;
   establishing, at the processor, a parameter defining a utilization characteristic for the port over time and a parameter threshold;

in response to determining that the first and the at least one subsequent bandwidth utilization measurements equal or exceed the predetermined utilization threshold, analyzing, at the processor, whether the parameter threshold has been met or exceeded; and in response to determining that the parameter threshold has been met or exceeded, setting, at the processor, a bandwidth utilization alert for the port wherein the bandwidth utilization alert indicates that bandwidth utilization at the port has reached a level that risks compromising a service provided to a device via the port.

2. The method of claim 1, wherein the parameter defining a utilization characteristic for the port over time is the number of adjacent measurements of bandwidth utilization that equal or exceed the predetermined utilization threshold.

3. The method of claim 2, wherein the parameter threshold is three.

4. The method of claim 2, wherein the parameter threshold is four.

5. The method of claim 2, further comprising:
establishing, at the processor, a second parameter defining a second utilization characteristic for the port over time and a second parameter threshold;
determining, at the processor, whether the second parameter threshold has been met or exceeded; and
setting, at the processor, a bandwidth utilization alert for the port in response to determining that the second parameter threshold has been met or exceeded.

6. The method of claim 5, wherein the second parameter is a percentage of adjacent bandwidth utilization measurements within a predetermined time window that meet or exceed the second parameter threshold.

7. The method of claim 6, wherein the second parameter threshold is at least 10% within the predetermined time window.

8. The method of claim 6, wherein the second parameter threshold is at least 20% within the predetermined time window.

9. The method of claim 1, wherein the parameter defining a utilization characteristic for the port over time is a percentage of measurements of bandwidth utilization that equal or exceed the predetermined utilization threshold within a set time period.

10. The method of claim 9, wherein the parameter threshold is at least 10% of readings within the set time period.

11. The method of claim 9, wherein the parameter threshold is at least 20% of readings within the set time period.

12. The method of claim 9, wherein the set time period is one hour.

13. The method of claim 1, wherein the predetermined utilization threshold is 60% of a total available utilization for the port.

14. The method of claim 1, wherein the predetermined utilization threshold is 70% of a total available utilization for the port.

15. The method of claim 1, wherein the measurements of bandwidth utilization also include an associated time stamp and a specific port ID.

16. The method of claim 15, further comprising determining, based on the associated time stamps, a time-aligned utilization value for a particular time based on the first and second measurements of bandwidth utilization, wherein the first measurement occurs prior to the particular time and the second measurement occurs after the particular time.

17. A system for monitoring bandwidth utilization on a port in a data network, the system comprising:

a data port configured to connect to a network access device;
a monitoring device configured to collect data related to bandwidth utilization for the port; and
an interpretation engine configured to:
receive a first measurement of bandwidth utilization at a first time for the port, wherein bandwidth utilization identifies a current amount of bandwidth of the port being used relative to a maximum available bandwidth of the port;
determine whether the first measurement of bandwidth utilization equals or exceeds a predetermined utilization threshold;
receive at least one subsequent measurement of bandwidth utilization at a subsequent time for the port;
determine whether the at least one subsequent measurement of bandwidth utilization equals or exceeds the predetermined utilization threshold;
establish a parameter defining a utilization characteristic for the port over time and a parameter threshold;
in response to determining that the first and the at least one subsequent bandwidth utilization measurements equal or exceed the predetermined utilization threshold, determine whether the parameter threshold has been met or exceeded; and
in response to determining that the parameter threshold has been met or exceeded, set a bandwidth utilization alert for the port wherein the bandwidth utilization alert indicates that bandwidth utilization at the port has reached a level that risks compromising a service provided to a network access device via the port.

18. The system of claim 17, wherein the parameter defining a utilization characteristic for the port over time is the number of adjacent measurements of bandwidth utilization that equal or exceed the predetermined utilization threshold.

19. The system of claim 18, wherein the interpretation engine is further configured to determine whether a preset percentage of adjacent measurements of bandwidth utilization that equal or exceed the predetermined utilization threshold occur within a predetermined time window.

20. The system of claim 17, wherein the parameter defining a utilization characteristic for the port over time is the percentage of measurements of bandwidth utilization that equal or exceed the predetermined utilization threshold within a set period.

21. A computer-readable medium comprising computer-executable instructions that when executed cause a computer device to perform operations comprising:

receiving a first data set comprising at least one measurement of bandwidth utilization at at least a first time for a port, wherein bandwidth utilization identifies a current amount of bandwidth of the port being used relative to a maximum available bandwidth of the port;
determining whether the at least one measurement of bandwidth utilization equals or exceeds a predetermined utilization threshold;
receiving a subsequent data set comprising at least one measurement of bandwidth utilization at at least a subsequent time for the port;
determining whether the at least one subsequent measurement of bandwidth utilization equals or exceeds the predetermined utilization threshold;
establishing a parameter defining a utilization characteristic for the port over time and a parameter threshold;
in response to determining that the at least one first and the at least one subsequent bandwidth utilization measurements equal or exceed the predetermined utilization threshold, determining whether the parameter threshold has been met or exceeded; and in response to determining that the parameter threshold has been met or exceeded, setting a bandwidth utilization alert for the port wherein the bandwidth utilization alert indicates that bandwidth utilization at the port has reached a level that risks compromising a service provided to a device via the port.

\* \* \* \* \*

UNITED STATES PATENT AND TRADEMARK OFFICE
CERTIFICATE OF CORRECTION

PATENT NO. : 8,797,891 B2  Page 1 of 1
APPLICATION NO. : 12/706455
DATED : August 5, 2014
INVENTOR(S) : Nishant Agarwal et al.

It is certified that error appears in the above-identified patent and that said Letters Patent is hereby corrected as shown below:

In the specification

Column 4, Line 24:
  Please delete "10." and insert --100.--

In the claims

Column 12, Line 31:
  In Claim 17, delete "a" and insert --the--

Signed and Sealed this
Seventeenth Day of November, 2015

Michelle K. Lee
*Director of the United States Patent and Trademark Office*